United States Patent
Bender

(10) Patent No.: US 11,333,103 B2
(45) Date of Patent: May 17, 2022

(54) METHOD TO RE-LOFT A REDESIGNED JET ENGINE PRIMARY EXHAUST NOZZLE FOR AN EXISTING AIRPLANE TO PROVIDE CLEARANCE TO AIRCRAFT HEAT SHIELD STRUCTURE TO PREVENT CONTACT, FRACTURE, AND LIBERATION OF PORTIONS OF THE NOZZLE WHICH MIGHT CAUSE HAZARD TO CONTINUED SAFE FLIGHT

(71) Applicant: The Boeing Company, Chicago, IL (US)

(72) Inventor: Norman Harold Bender, Mercer Island, WA (US)

(73) Assignee: THE BOEING COMPANY, Chicago, IL (US)

( * ) Notice: Subject to any disclaimer, the term of this patent is extended or adjusted under 35 U.S.C. 154(b) by 221 days.

(21) Appl. No.: 16/415,310

(22) Filed: May 17, 2019

(65) Prior Publication Data

US 2020/0362794 A1    Nov. 19, 2020

(51) Int. Cl.
| | | |
|---|---|---|
| *F02K 1/00* | (2006.01) | |
| *F02K 1/82* | (2006.01) | |
| *B64D 33/04* | (2006.01) | |
| *F02K 1/52* | (2006.01) | |

(52) U.S. Cl.
CPC ............... *F02K 1/82* (2013.01); *B64D 33/04* (2013.01); *F02K 1/52* (2013.01)

(58) Field of Classification Search
CPC .............. F02K 1/82; F02K 1/52; B64D 33/04
See application file for complete search history.

(56) References Cited

U.S. PATENT DOCUMENTS

| | | | | |
|---|---|---|---|---|
| 3,393,518 A | * | 7/1968 | Bridge ...................... | F02K 1/52 60/770 |
| 4,066,214 A | * | 1/1978 | Johnson .................. | F02K 1/386 239/265.19 |
| 4,280,587 A | * | 7/1981 | Bhat ......................... | F02K 1/50 181/213 |
| 4,288,984 A | * | 9/1981 | Bhat ......................... | F02K 1/44 60/226.1 |
| 2008/0236138 A1 | * | 10/2008 | Gustafsson ............ | B64D 33/04 60/226.1 |
| 2010/0205930 A1 | * | 8/2010 | Conete ...................... | F02K 1/78 60/226.1 |
| 2018/0209294 A1 | * | 7/2018 | Gallet ...................... | F01D 1/023 |

\* cited by examiner

*Primary Examiner* — Katheryn A Malatek
(74) *Attorney, Agent, or Firm* — Gates & Cooper LLP

(57) ABSTRACT

A nozzle having a forward portion skewed downwards and an aft portion translated downwards provides sufficient clearance between the nozzle and the heat shield structure to prevent contact in the event of large deflections (e.g., as associated with a fan blade Out (FBO) condition). Such large deflections must be accounted for to meet federal aviation regulations and gain airplane CFR 14 Part 25 Certification.

21 Claims, 10 Drawing Sheets

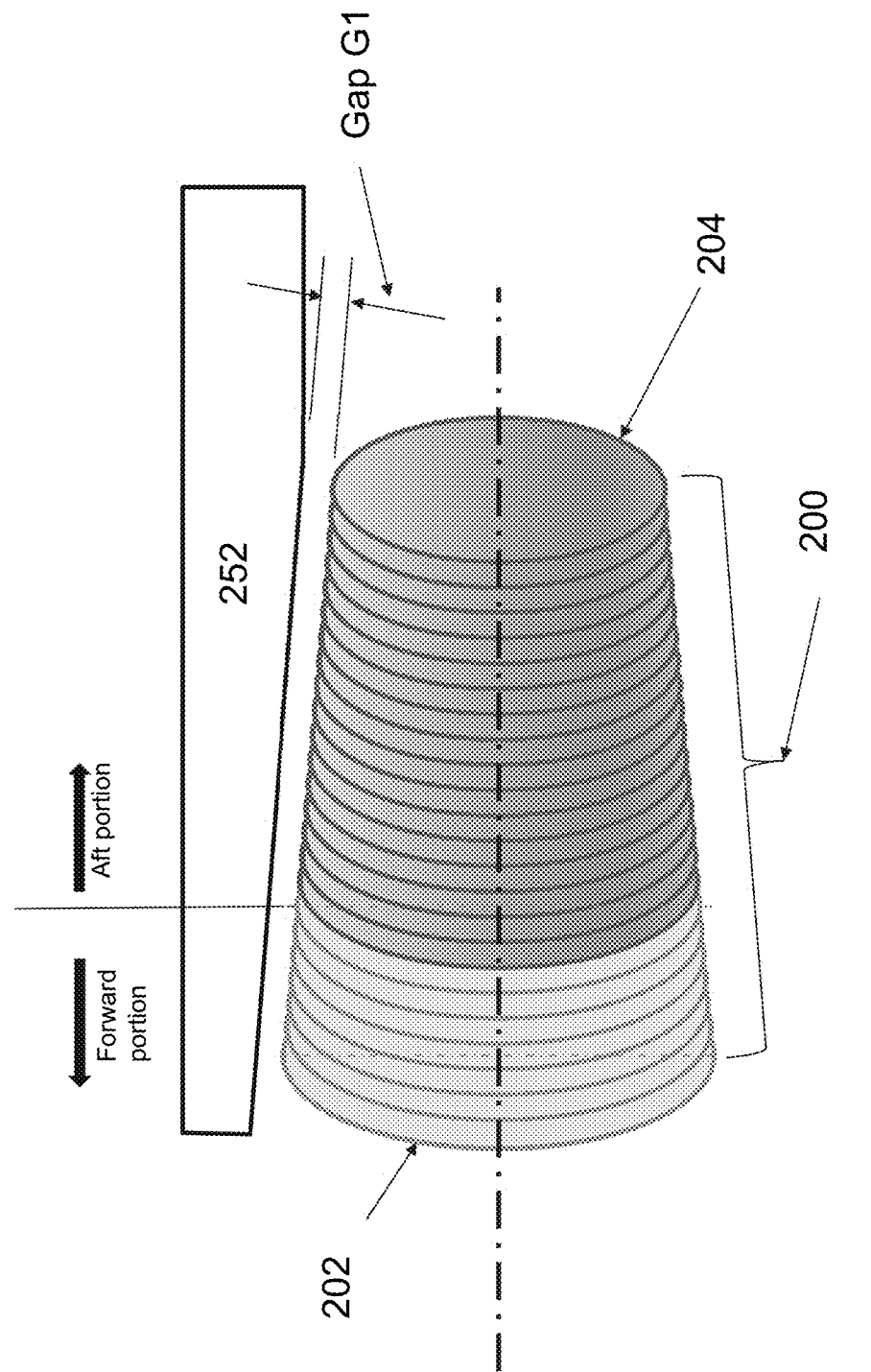

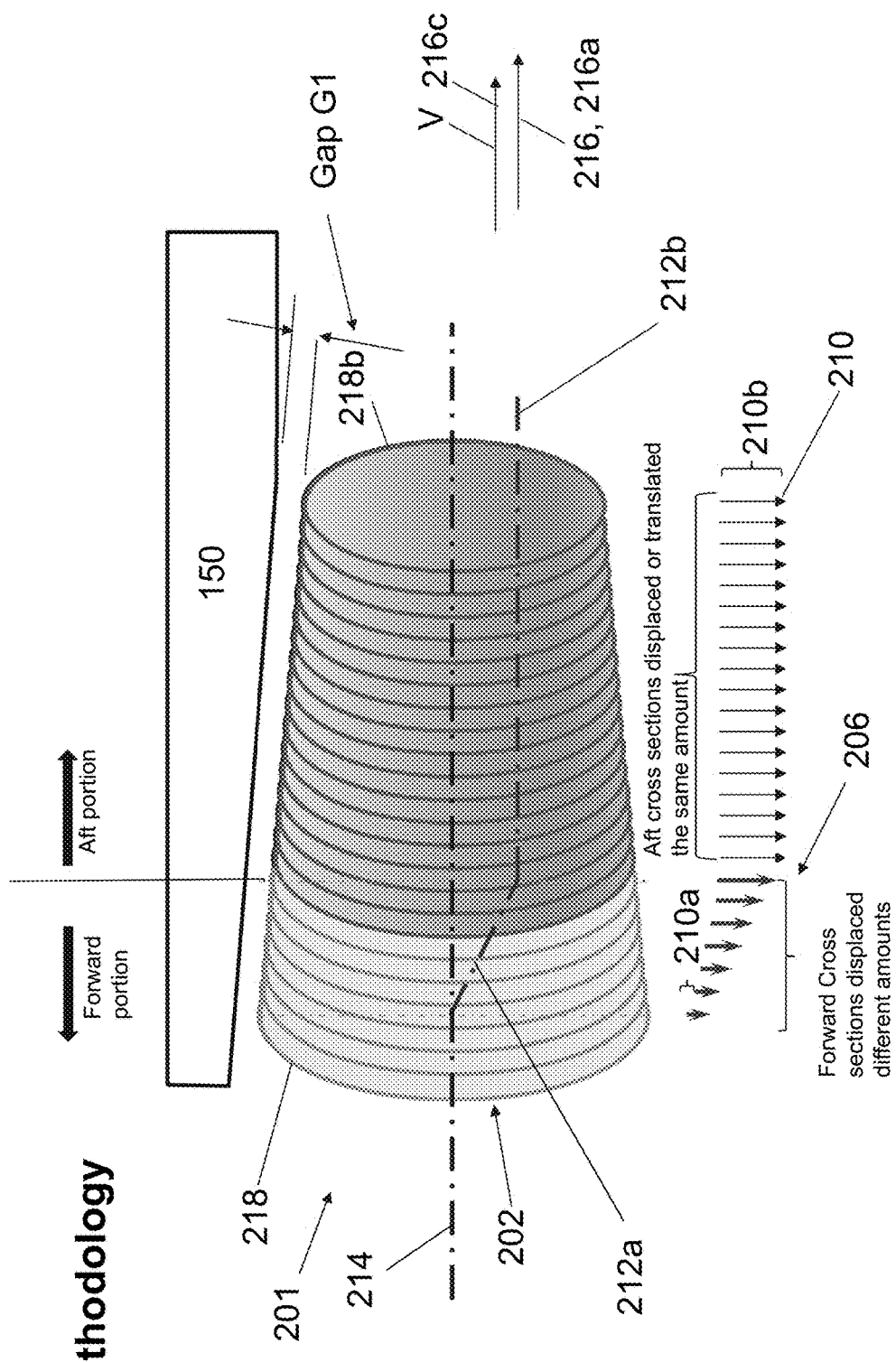

METHOD TO RE-LOFT A REDESIGNED JET ENGINE PRIMARY EXHAUST NOZZLE FOR AN EXISTING AIRPLANE TO PROVIDE CLEARANCE TO AIRCRAFT HEAT SHIELD STRUCTURE TO PREVENT CONTACT, FRACTURE, AND LIBERATION OF PORTIONS OF THE NOZZLE WHICH MIGHT CAUSE HAZARD TO CONTINUED SAFE FLIGHT

STATEMENT REGARDING FEDERALLY SPONSORED RESEARCH AND DEVELOPMENT

This invention was made with Government support under Contract No. FA8625-16-C-6599 awarded by the Department of Defense. The Government has certain rights in this invention.

BACKGROUND

1. Field

The present disclosure relates to an exhaust system for an aircraft turbofan engine.

2. Description of the Related Art

FIG. 1 is a schematic view of an aircraft engine 100 including a nacelle 100a, an intake or inlet 102, a fan 104 having fan blades 104a; and an engine core including a low pressure compressor 106, a high pressure compressor 108, a combustion chamber 110; a fan nozzle 112, a high pressure turbine 114; a low pressure turbine 116; and a core nozzle 118. Also shown is a thrust reverser and fan duct cowl 120. Air drawn by fan into the fan duct 122 is exhausted as fan flow 124. Air drawn by the fan into the engine core is compressed in low pressure compressor 106 and high pressure compressor 108 to form compressed air. The compressed air is used to burn fuel in the combustion chamber 110 and converted to exhaust gases outputted through the high pressure turbine 114, the low pressure turbine 116 and through a core gas path to the core nozzle 118. The core nozzle accelerates the exhaust gases from the engine core to near sonic speed to maximize this first component (primary flow 126) of thrust generated from the aircraft engine 100. The fan flow 124 provides a second component of thrust from the aircraft engine 100.

FIG. 1 further illustrates a heat shield 150 positioned to deflect the exhaust gases (fan flow 124 and primary flow 126) away from aircraft structures (e.g., wing 152) that may be damaged by the exhaust gases. As illustrated in FIG. 1, the heat shield is attached to an aircraft structure (strut 154 and strut aft fairing 156), not directly to the aircraft engine, and a clearance gap G is provided to allow some motion of the core nozzle 118 relative to the heat shield 150 without the two structures contacting.

Conventional core nozzles are fabricated from metal which will yield if contact with the heat shield occurs during certain deflections of the core nozzle and/heat shield (e.g., as caused by an engine failure such as breakage of a fan blade). However, metal nozzles are heavy and reduce fuel efficiency of the engine. What is needed, then, are methods to increase fuel efficiency of the engine without sacrificing safety. The present disclosure satisfies this need.

SUMMARY

The present disclosure describes an exhaust nozzle configuration for providing sufficient clearance between the exhaust nozzle and a surrounding structure such as a heat shield. The clearance ensures that the exhaust nozzle and the surrounding structure (e.g., heat shield) do not contact one another in the event of certain high load conditions (e.g., fan blade out or breakage conditions) which typically cause significant deflection of the nozzle.

In one or more embodiments, the nozzle is divided into a forward portion and an aft portion. The forward portion is moved away from the heat shield structure, while substantially maintaining the centerline of the flow through the aft portion of the nozzle, thereby minimizing impact on engine performance.

The exhaust nozzle can be embodied in many ways including but not limited to, the following.

1. An exhaust nozzle comprising a forward portion having a plurality of forward portion station plane lofts normal to a longitudinal axis, each forward portion station plane loft indexed with an integer n so that the $(n+1)^{th}$ station plane loft is closer to an exit plane of the exhaust nozzle than the $n^{th}$ station plane loft, wherein the $(n+1)^{th}$ station plane loft is (1) shifted in a direction perpendicular to the longitudinal axis, and away from the heat shield (2) incrementally shifted further away from the longitudinal axis as compared the $n^{th}$ station plane loft, and (3) and optionally has a smaller flow area as compared to the $(n+0)^{th}$ station plane loft. The exhaust nozzle further includes an aft portion connected to the forward portion, the aft portion having aft portion station plane lofts normal to the longitudinal axis, wherein the aft portion station plane lofts have a centerline parallel to the longitudinal axis.

2. The exhaust nozzle of embodiment 1, wherein the forward portion station plane lofts are shifted relative to each other by one or more amounts, and the aft portion has a length; such that, when the exhaust nozzle is disposed around a body and flow of gas between the nozzle and the body generates thrust, the thrust has a thrust vector substantially parallel to the longitudinal axis at an exit plane of the exhaust nozzle.

3. The exhaust nozzle of embodiment 2, wherein the exhaust nozzle comprises a core exhaust nozzle for a airplane gas turbine engine installation comprising a fan including fan blades, and the one or more amounts and the length of G1 plus G2 prevent contact between a heat shield and the exhaust nozzle if one or more of the blades break during operation of the fan under flight conditions when the heat shield is positioned between the core exhaust nozzle and an aircraft structure of an aircraft propelled using the exhaust nozzle.

4. The exhaust nozzle of embodiment 3, wherein a clearance C between the aft portion of the core exhaust nozzle and the heat shield is 0.5 inches S C S 5 inches.

5. The exhaust nozzle of embodiments 3 or 4, wherein the aircraft structure is a fairing, wing, a fuselage, or an empennage.

6. The exhaust nozzle of any one of the embodiments 1-5, further comprising a wedge attached to the forward portion so that the core exhaust nozzle is further canted away from the heat shield.

7. The exhaust nozzle of embodiment 6, further comprising the wedge in between the forward portion and the aft portion.

8. The exhaust nozzle of any one of the embodiments 1-7, wherein the exhaust nozzle consists essentially of (or comprises) a Ceramic Matrix Composite or other brittle or non-ductile material that might fracture under the contact with the heat shield.

9. The exhaust nozzle of any one of the embodiments 1-8 implemented as a core exhaust nozzle in a airplane gas turbine engine installation.

10. An airplane gas turbine engine installation including a nacelle comprising an inlet and a fan exhaust nozzle; turbo-machinery housed in the nacelle, the turbo-machinery including a fan having fan blades, an engine core including an engine combustion chamber, and a longitudinal axis; a core exhaust nozzle connected to the engine core; and the core exhaust nozzle including a forward portion and an aft portion. The forward portion includes a slope, slant, or skew in a direction away from the heat shield; and the aft portion, connected to an aft end of the forward portion, is translated away from the longitudinal axis.

11. The airplane gas turbine engine installation of embodiment 10, wherein, when the fan blades spin or rotate about the longitudinal axis during operation of the gas turbine engine to generate thrust: (1) a first portion of air is drawn through the inlet into the engine core, and (2) a second portion of the air is drawn through the inlet into a fan duct between the engine core and the nacelle. Burning fuel in the engine core using the first portion of the air forms first exhaust gas exhausted through the core exhaust nozzle. The second portion of the air is exhausted as second exhaust gas through the fan exhaust, and the first exhaust gas and the second exhaust gas generate the thrust.

12. The airplane gas turbine engine installation of embodiments 11 or 12, wherein the slope of the forward portion is configured to prevent the core exhaust nozzle from contacting the heat shield if one or more of the fan blades break during operation of the airplane gas turbine engine installation when the heat shield is positioned between the core exhaust nozzle and an aircraft structure of an aircraft being propelled by the airplane gas turbine engine installation.

13. The airplane gas turbine engine installation of embodiments 10, 11, or 12, wherein the forward portion includes a slope in the direction that increases a shortest distance between the forward portion and the heat shield so that the shortest distance at the aft end of the forward portion is longer than at a forward end of the forward portion, and the aft portion is translated away from the longitudinal axis so that a centerline of the aft portion is parallel to the longitudinal axis.

13. The airplane gas turbine engine installation of embodiment of embodiment 11, wherein the first exhaust gas generates a thrust vector at an exit plane of the core exhaust nozzle and a degree of the slope and length of the aft portion are sufficient to maintain the thrust vector substantially parallel to the longitudinal axis.

BRIEF DESCRIPTION OF THE DRAWINGS

FIG. 2A-2C illustrate a skewing methodology and an exhaust nozzle according to one or more embodiments.

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Technical Description

A Ceramic Matrix Composite (CMC) exhaust nozzle has lighter weight than a metal exhaust nozzle and therefore increases fuel efficiency of an airplane propelled using the exhaust nozzle. However, the CMC exhaust nozzle cannot tolerate contact with surrounding structures such as an exhaust heat shield without fracturing and liberating parts. Such fracturing presents concerns for continued safe flight. Examples of situations that may cause contact between the exhaust nozzle and surrounding structure include deflections of engine components, e.g., as might occur in the event of breakage of one of the fan blades (e.g., also known as a fan blade out load).

Thus, the CMC exhaust nozzle needs to be positioned further away from the surrounding structure (as compared to a metal nozzle) to prevent fracture of the CMC exhaust nozzle. However, canting all the exhaust nozzle's aerodynamic lines downward (i.e., pivoting the entire exhaust nozzle centerline downward) does not provide sufficient clearance for the forward/mid portion of the nozzle and also changes the nozzle vector (i.e., flow direction of the exhaust gases outputted between the nozzle and the centerbody).

The present disclosure describes exhaust nozzle embodiments that overcome the problem of insufficient clearance by implementation of an exhaust nozzle geometry that prevents contact of the exhaust nozzle with the heat shield during certain deflections, while at the same time reducing, mitigating, or minimizing detrimental impact or change in the thrust vector of the exhaust gas outputted from the nozzle.

First Example: Exhaust Nozzle

Figure 1:
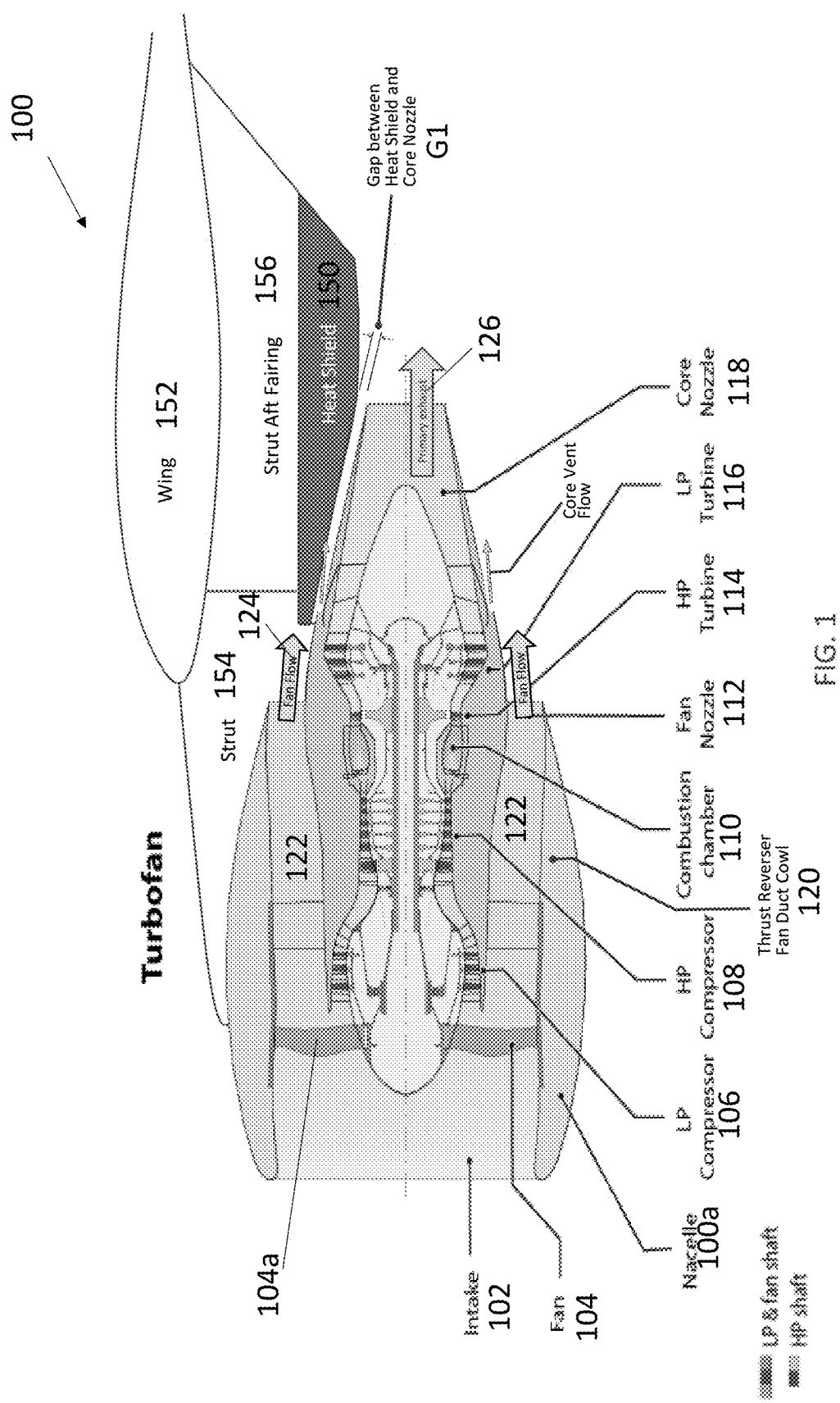
FIG. 1 illustrates a perspective view of a conventional aircraft engine.
Figure 2C:
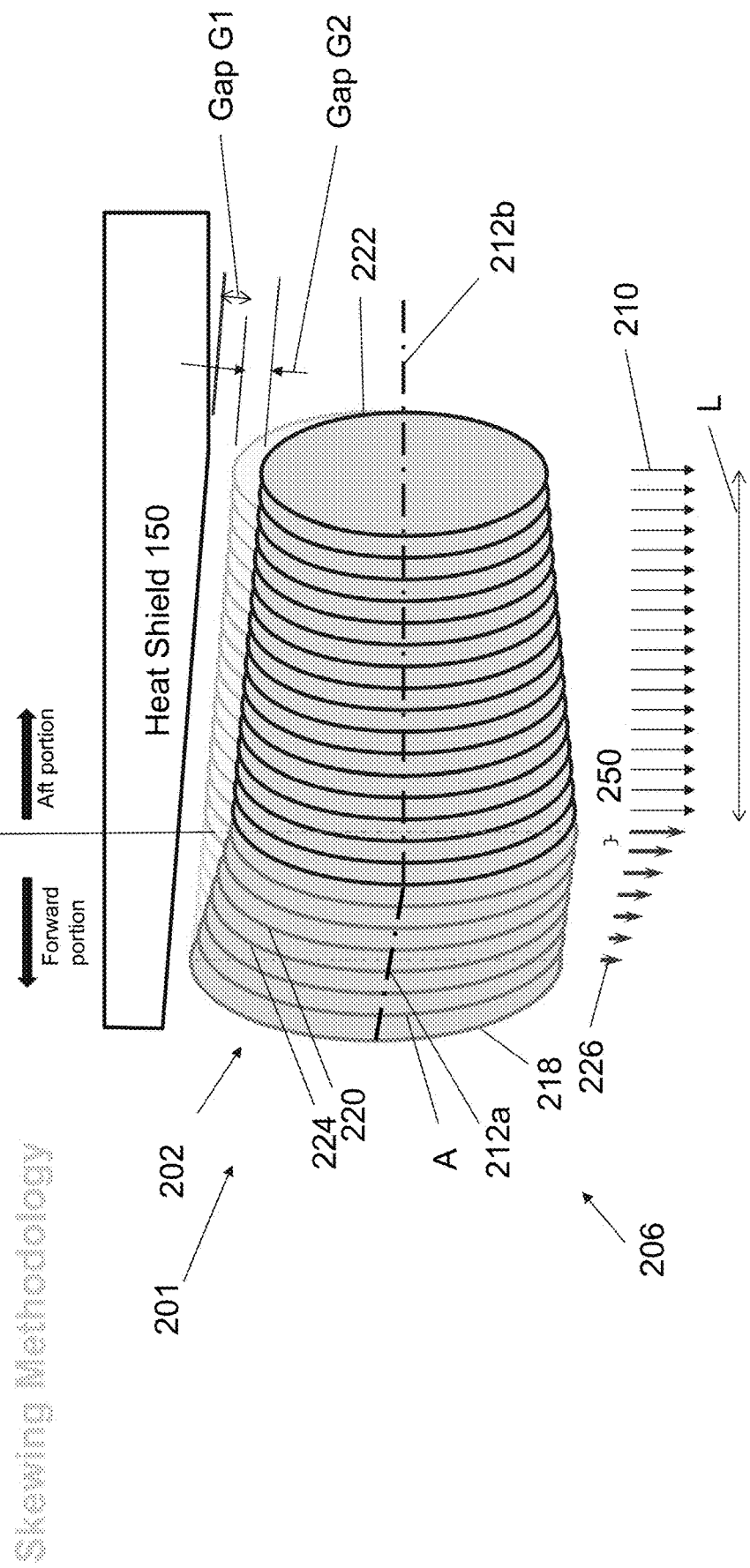

FIGS. 2A-2C illustrate a skewing methodology for modifying or lofting an exhaust nozzle 200 according to one or more embodiments. FIG. 2A illustrates the method comprises identifying a forward portion 202 and an aft portion 204 of the exhaust nozzle 200; and FIG. 2B illustrates skewing 206 or slanting the forward portion 202 away from an aircraft structure (e.g., heat shield 150) to gain clearance to the aircraft structure. The aft portion 204 is then positioned so that the aft portion 204 is translated 210 and a first centerline 212a of the forward portion and the second centerline 212b of the aft portion intersect. However, the second centerline 212b of the aft portion remains substantially parallel to an aft direction 216c and a longitudinal axis 214 of the engine so as to minimize any impact on thrust 216a in the aft direction generated by exhaust gas 216 exiting the aft portion, thereby minimizing or reducing change in a thrust vector V of the exhaust gas. In the embodiment of FIG. 2B, the forward portion 202 comprises forward portion station plane lofts 218 normal to the longitudinal axis 214, the skewing 206 comprises shifting the forward portion station plane lofts 218 relative to each other by one or more amounts 210a so that the first centerline 212a slants away from the aft direction, and the aft portion comprises aft portion station plane lofts 218b normal to the longitudinal axis 214 wherein the aft portion station plane lofts 218b are translated 210 by the same amount 210b so that the aft portion station plane lofts 218b have a common centerline comprising the second centerline 212b parallel to the longitudinal axis 214. As used herein, a forward portion station plane loft 218 and an aft portion station plane loft 218b are defined as a cross section perpendicular to the longitudinal axis 214 and wherein the cross-section defines the shape of the exhaust nozzle 200, 201.

FIG. 2C illustrates the end result, an exhaust nozzle 201 comprising the plurality of forward portion station plane lofts 218 indexed with an integer n so that the $(n+1)^{th}$ station plane loft 220 is closer to an exit plane 222 of the exhaust nozzle 201 than the $n^{th}$ station plane loft 224. The $(n+1)^{th}$ station plane loft 220 is shifted in a direction 226 perpendicular to the longitudinal axis 214 and is (e.g., incrementally) further away from the longitudinal axis 214 than the $n^{th}$ station plane loft. The $(n+1)^{th}$ station plane loft optionally has a smaller flow area A, as compared to the $n^{th}$ station plane loft 224. Flow area A refers to the surface area of each cross section of the exhaust nozzle through which exhaust gases 216 can flow.

FIG. 2C further illustrates the initial clearance gap G1 to the heat shield 150 (prior to shifting the forward portion station plane loft 218 and the aft portion station plane loft 228) and the additional clearance gap G2 added to the initial clearance gap G1 using the skewing methodology illustrated in FIGS. 2A-2B. In one or more examples, the clearance between the aft portion of the exhaust nozzle and a heat shield includes a clearance gap C=G1+G2 wherein 0.25 inches≤C≤5 inches (e.g., along an entire length L of the aft portion).

In one or more examples, the exhaust nozzle consists essentially of a Ceramic Matrix Composite or other brittle or non-ductile material that might fracture under the contact with the heat shield. However, the exhaust nozzle can be fabricated from any material including, but not limited to, metal.

In one or more examples, the exhaust nozzle is fabricated using a fiber lay up process suitable for fabricating a ceramic matrix composite material, comprising depositing one or more fiber layers on one or more mandrels having the shape of the forward portion and/or the aft portion, so that the one or more fiber layers are molded by or acquire the shape of the mandrel(s). The exhaust nozzle comprises at least in part the ceramic matrix composite material after removal of the one or more fiber layers from the mandrels and appropriate processing.

Second Example: Exhaust Nozzle in Combination with Centerbody

Figure 3:
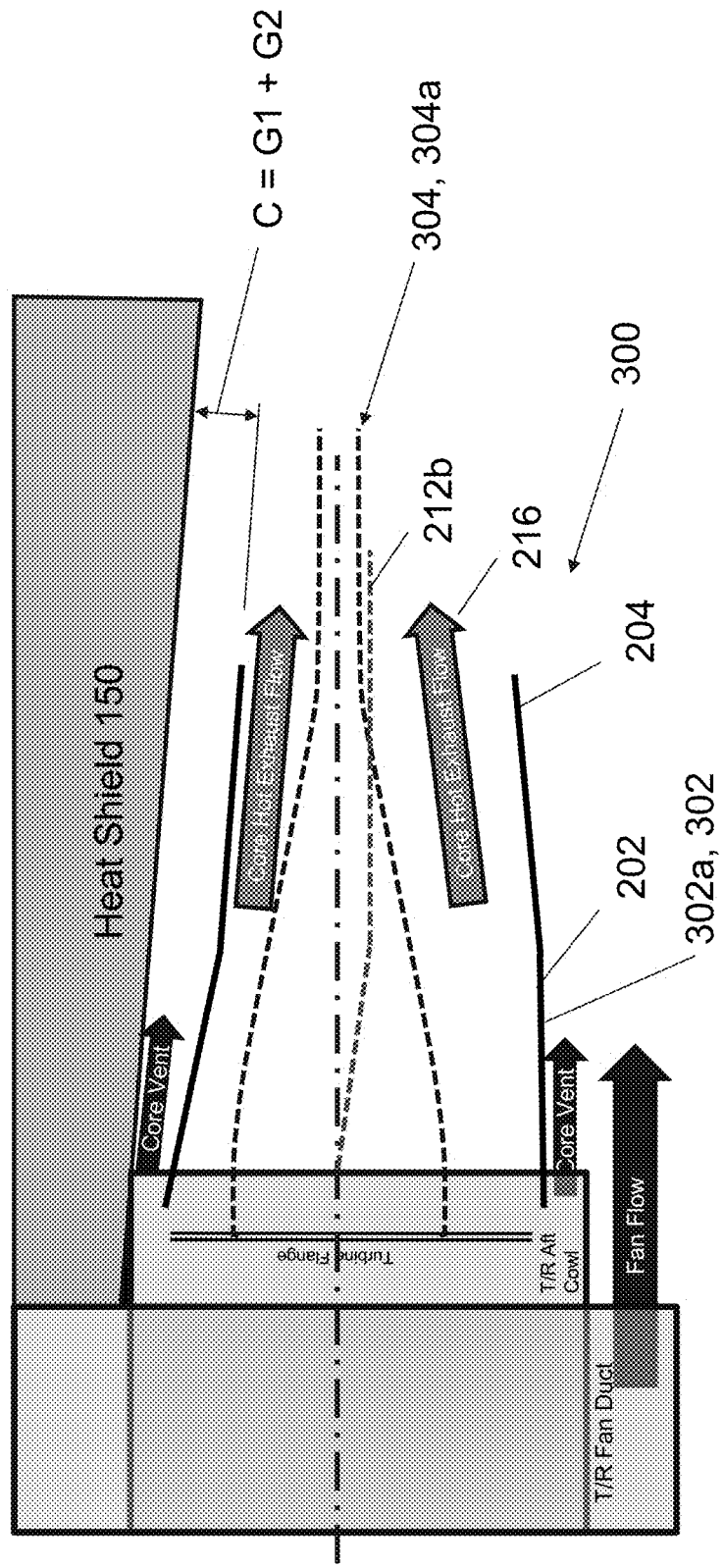
FIG. 3 illustrates a long core nozzle embodiment including a centerbody.

FIG. 3 illustrates an example exhaust nozzle 201 comprising a long core nozzle 300 having a skew 302 or slope 302a so the forward portion station plane lofts 218 are shifted relative to each other by one or more amounts 210a, and the aft portion has a length L; such that, when the exhaust nozzle 201 is disposed around a body 304 (e.g., centerbody 304a) and flow of exhaust gas 216 (e.g., core hot exhaust flow) between the exhaust nozzle and the body generates thrust 216a, the thrust has the thrust vector V substantially parallel to the longitudinal axis 214 at the exit plane 222 of the exhaust nozzle.

Figure 4:
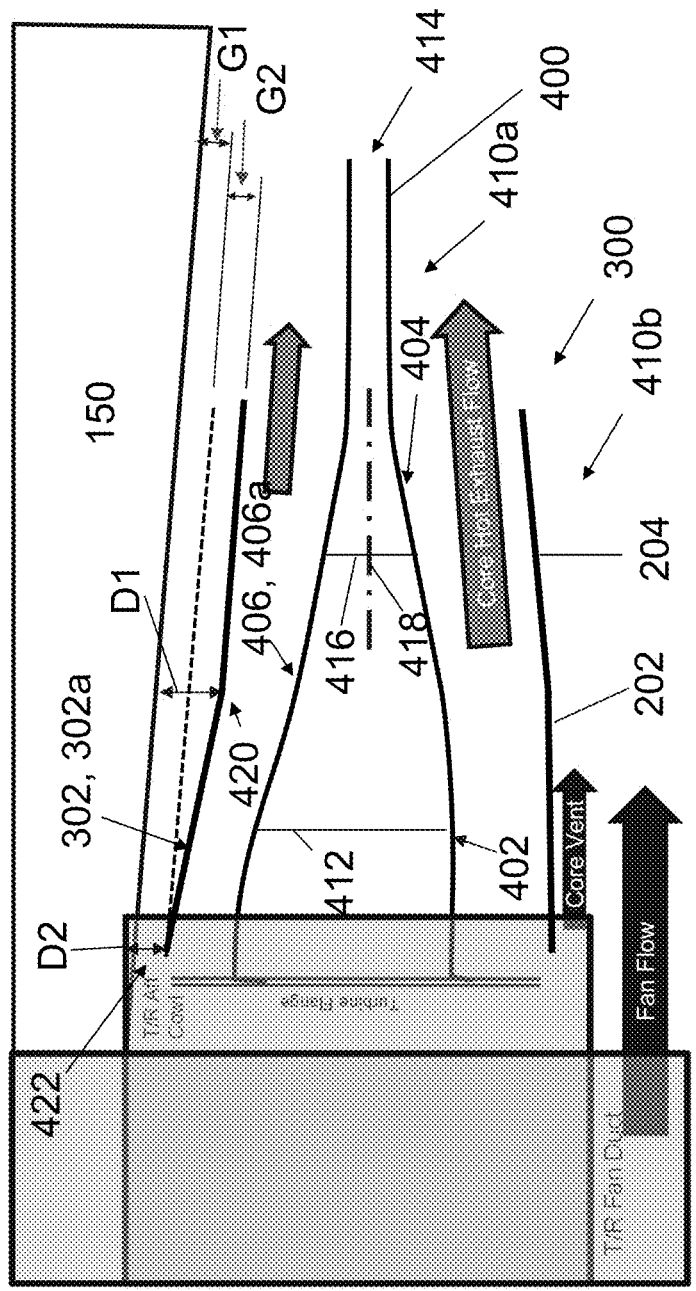
FIG. 4 illustrates an embodiment including a skewed centerbody in combination with a long core nozzle.

The centerbody 304a can be unskewed (as illustrated in FIG. 3) or the centerbody 400 can be skewed as illustrated in FIG. 4. More specifically, FIG. 4 illustrates an example wherein the centerbody 400 has a centerbody forward portion 402 and a centerbody aft portion 404, the centerbody forward portion includes a skew 406 or slope 406a and the centerbody aft portion is translated 408, so that a shape 410a of the centerbody conforms with the shape 410b of the exhaust nozzle 201. Specifically, the centerbody forward portion 402 has a plurality of centerbody forward portion station plane lofts 412 normal to a longitudinal axis 214, each centerbody forward portion station plane loft indexed with an integer j so that the $(j+1)^{th}$ centerbody station plane loft is closer to an exit plane 414 of the centerbody than the $j^{th}$ centerbody station plane loft. The $(j+1)^{th}$ centerbody station plane loft is shifted in a direction perpendicular to the longitudinal axis and optionally has a smaller flow area, as compared to the $j^{th}$ centerbody station plane loft. The centerbody cross sections at any station plan are shifted similarly to the nozzle cross sections shift to retain a concentric relationship between the centerbody and the nozzle. The centerbody aft portion connected to the centerbody forward portion includes centerbody aft portion station plane lofts 416 normal to the longitudinal axis, each centerbody aft portion station plane loft 416 having a third centerline 418 parallel to the longitudinal axis 214.

FIG. 4 further illustrates the long core exhaust nozzle 300 has the forward portion including a skew 302 or slope 302a in a direction that increases a shortest distance between the forward portion 202 and the heat shield 150 so that the shortest distance D1 at an aft end 420 of the forward portion is longer than the shortest distance D2 at a forward end 422 of the forward portion, and the aft portion 204 is translated away from the longitudinal axis so that the second centerline 208 of the aft portion 204 is substantially parallel to the longitudinal axis 214.

Third Example: Exhaust Nozzle in Combination with a Wedge

Figure 5:
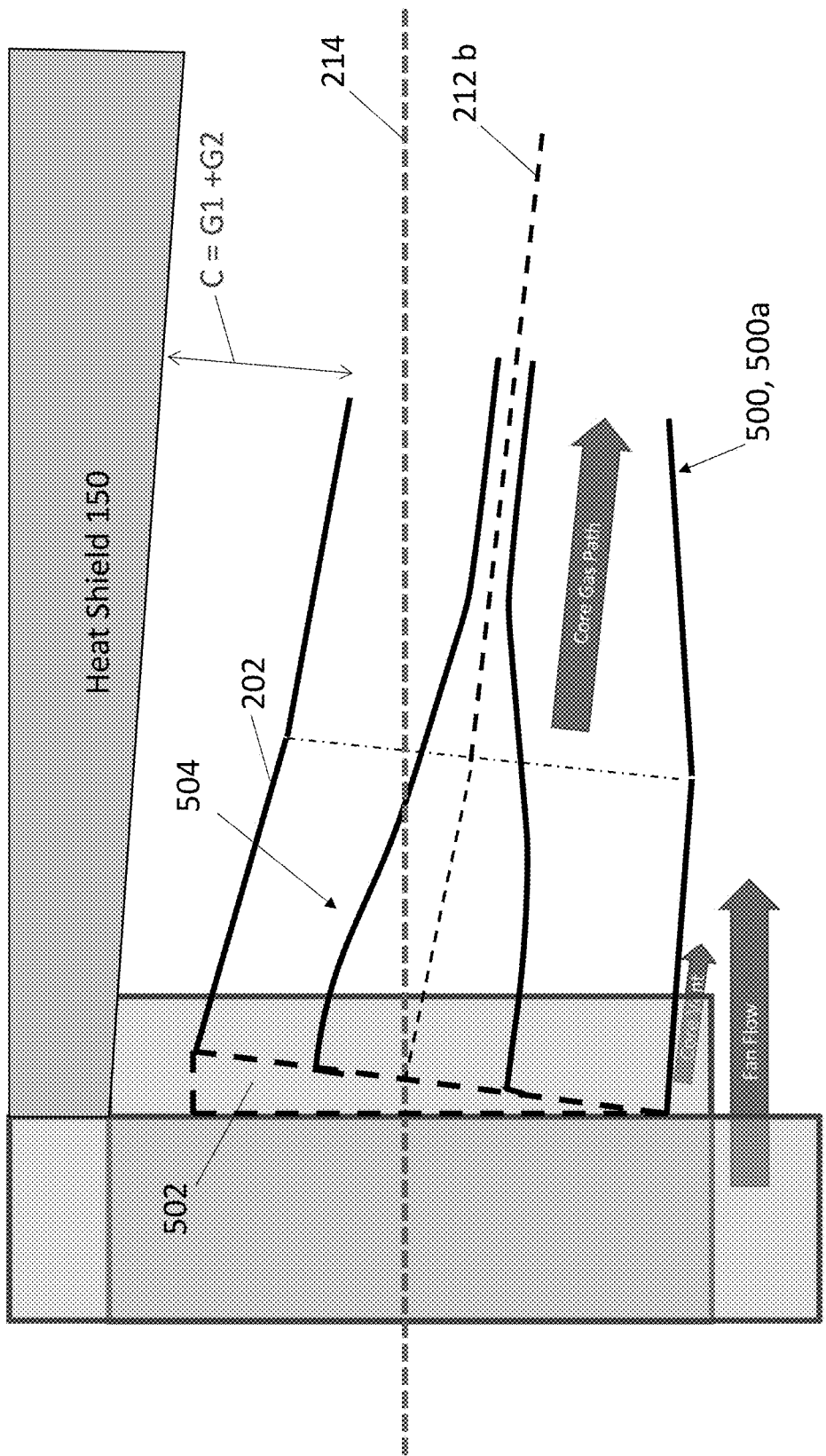
FIG. 5 illustrates adding a wedge at the forward end of the nozzle, thereby providing further clearance tailoring to the heat shield.

FIG. 5 illustrates an example exhaust nozzle 500 (including fairing 500a) wherein a wedge 502 is attached to the forward portion 202 so that the exhaust nozzle 500 is further canted away from the heat shield 150. Positioning the wedge 502 allows for increased clearances C along the length of the exhaust nozzle 500, as compared to without the wedge 502. In the example shown, the centerbody 504 is also attached to the wedge so that the centerbody 504 is also canted away from the heat shield 150.

Figure 6:
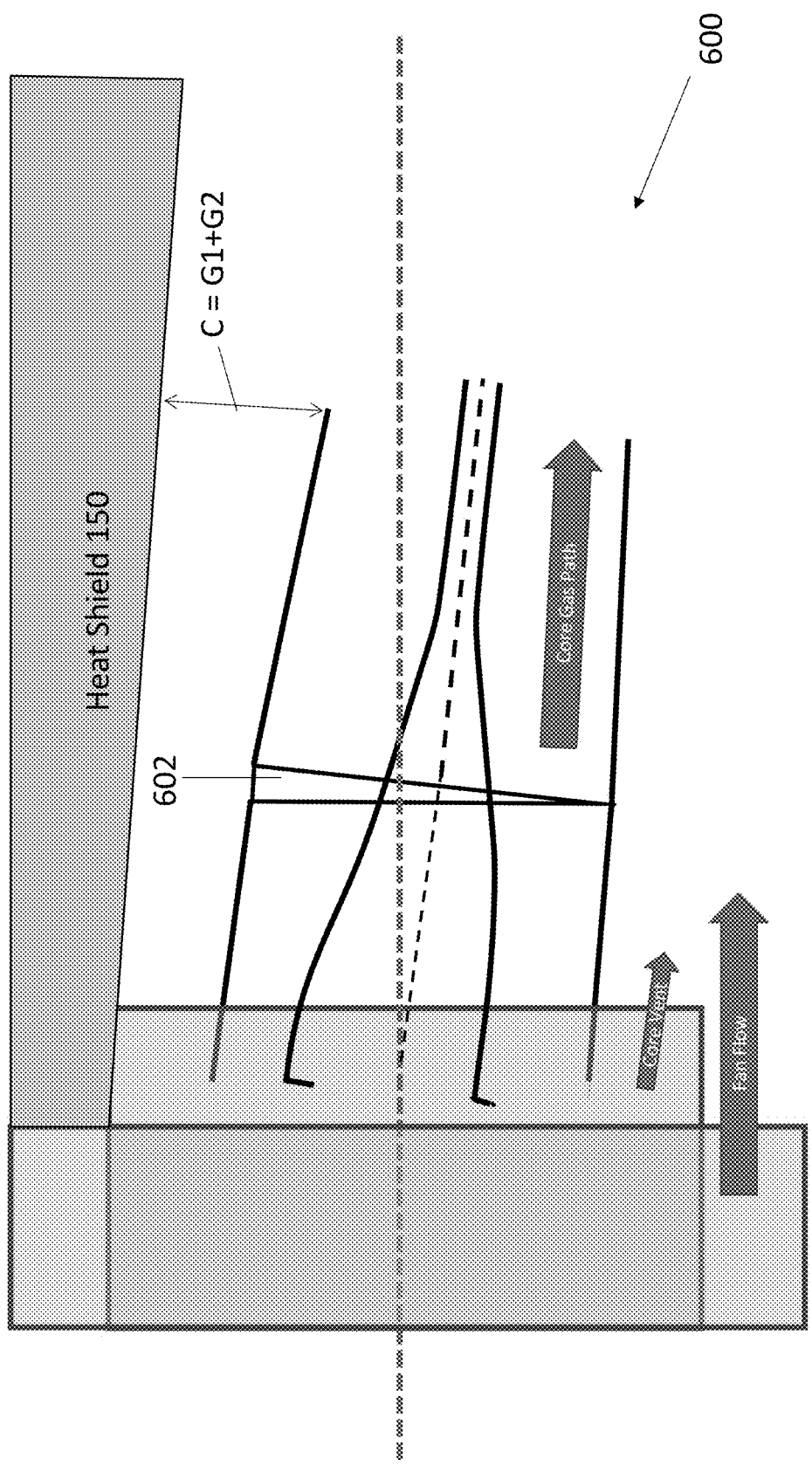
FIG. 6 illustrates adding a wedge further aft in the nozzle can provide different clearance tailoring.

FIG. 6 illustrates an example exhaust nozzle 600 wherein the wedge 602 is in between the forward portion and the aft portion.

In one or more examples, the further cant introduced by the wedge angles the thrust vector V away from the longitudinal axis 214.

Fourth Example: Combination with Airplane Gas Turbine Engine Installation

Figure 7A:
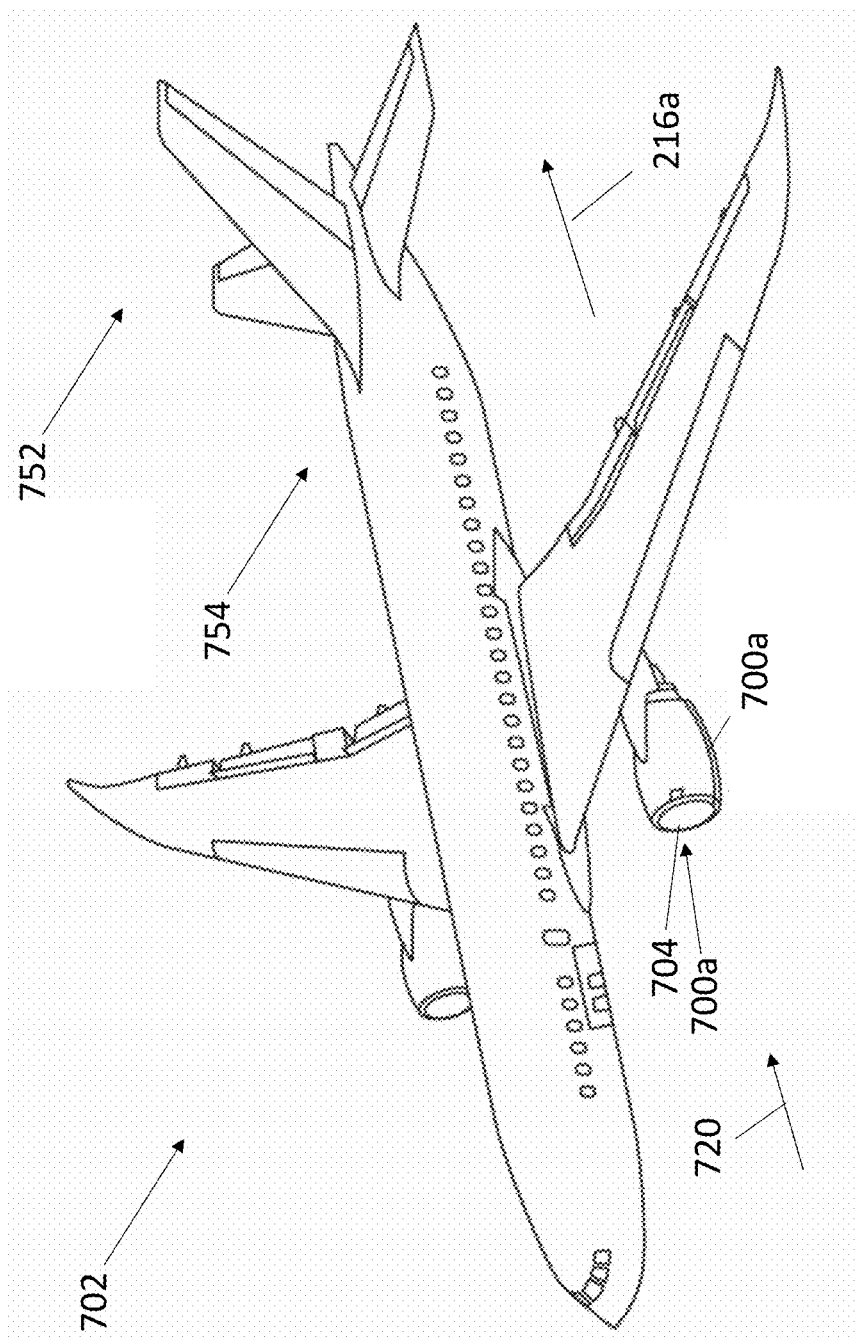
FIG. 7A illustrates an aircraft propelled using a core exhaust nozzle according to one or more embodiments.
Figure 7B:
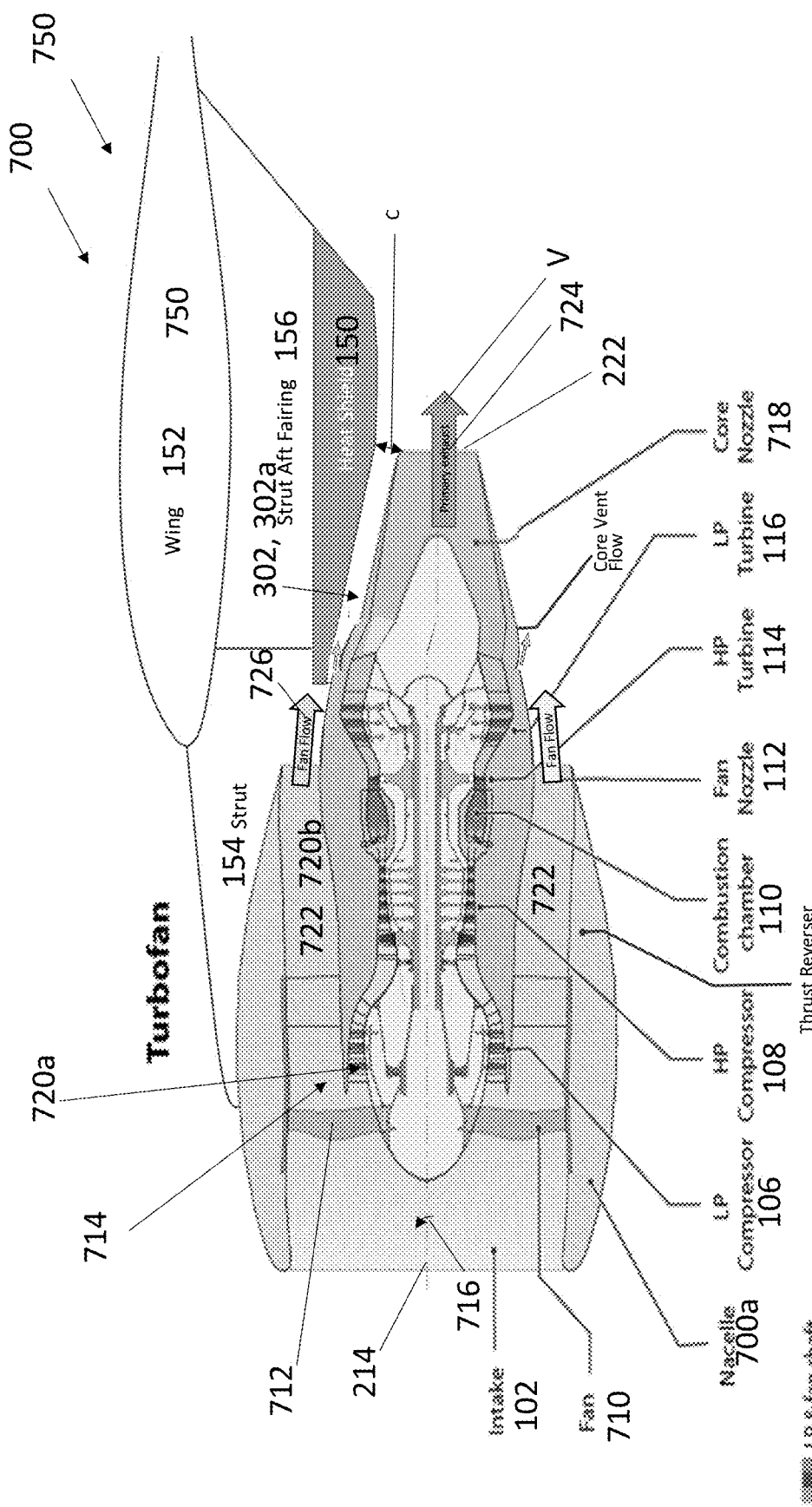
FIG. 7B illustrates a airplane gas turbine engine installation including the core exhaust nozzle according to one or more embodiments.

FIGS. 7A and 7B illustrates a airplane gas turbine engine installation 700 that can be mounted on an aircraft 702, the airplane gas turbine engine installation 700 comprising a nacelle 700a comprising an inlet 704 and a fan exhaust 706; turbo-machinery 708 housed in the nacelle, the turbo-machinery including a fan 710, 104 having fan blades 712, 104a; an engine core 714 including an engine combustion chamber 110, and a longitudinal axis 214 of rotation 716 of the turbo-machinery; and a core exhaust nozzle 718 connected to the engine core 714. The core exhaust nozzle 718 includes a forward portion 202 and an aft portion 204, wherein the forward portion includes a skew away from a heat shield, and the aft portion connected to an aft end of the forward portion is translated away from the longitudinal axis. When the fan blades 712 spin or rotate about the longitudinal axis 214 during operation of the airplane gas turbine engine installation to generate thrust 216a, a first portion 720a of air 720 is drawn through the inlet into the engine core, and a second portion 720b of the air 720 is drawn through the inlet into a fan duct 722 between the engine core and the nacelle. Burning fuel F in the engine combustion chamber using the first portion of the air forms first exhaust gas 724 (primary exhaust) exhausted through the core exhaust nozzle. The second portion of the air is exhausted as second exhaust gas 726 (fan flow) through the fan exhaust 706, so that the first exhaust gas and the second exhaust gas are used to generate the thrust 216a. In one or more examples, the first exhaust gas generates a thrust vector V at an exit plane 222 of the core exhaust nozzle and a degree of the slope and length of the aft portion are sufficient to maintain the thrust vector substantially parallel to the longitudinal axis 214. In one or more examples, the core exhaust nozzle 718 comprises the exhaust nozzle of FIG. 2C, FIG. 3, FIG. 4, FIG. 5, or FIG. 6. In one example, the forward portion includes a slope 302a in the direction that increases a shortest distance between the forward portion and the heat shield so that the shortest distance at the aft end of the forward portion is longer than at a forward end of the forward portion. The aft portion is translated away from the longitudinal axis so that the centerline of the aft portion is parallel to the longitudinal axis. The technical effect of the slope 302a or skew 302 of the forward portion or the shifted station plane lofts 218 is that the core exhaust nozzle 718 does not contact the heat shield 150 if one or more of the fan blades break during operation of the airplane gas turbine engine installation when the heat shield is positioned between the core exhaust nozzle and an aircraft structure 750 (e.g., wing 152, fairing, fuselage 754, or empennage 752) of an aircraft being propelled by the airplane gas turbine engine installation and the degree of the slope and length of the aft portion are sufficient to maintain the thrust vector V parallel to the longitudinal axis 214.

The exhaust nozzle according to embodiments described herein is not limited to implementation in a airplane gas turbine engine installation. The exhaust nozzle can be used as a propulsor in any propulsion system including, but not limited to, a rocket engine.

Example Embodiments

An apparatus according to embodiments described herein can be embodied in many ways including, but not limited to, the following.

Clause 1. A airplane gas turbine engine installation (700), comprising:
  a nacelle (100a, 700a) comprising an inlet (102, 704) and a fan exhaust (706);
  turbo-machinery (708) housed in the nacelle (100a, 700a), the turbo-machinery (708) including a fan (104, 710) having fan blades (712, 104a), an engine core (714) including an engine combustion chamber, and a longitudinal axis (214) of rotation of the turbo-machinery (708);
  a core exhaust nozzle (718) connected to the engine core (714); the core exhaust nozzle (718) including a forward portion (202) and an aft portion (204), wherein:
    the forward portion (202) includes a slope (302a) away from a heat shield (150), and
    the aft portion (204) connected to an aft end (420) of the forward portion (202) is translated (210) away from the longitudinal axis (214).

Clause 2. The airplane gas turbine engine installation of clause 1, wherein the slope (302a) is configured or has a gradient such that the core exhaust nozzle (718) does not make a contact to the heat shield (150) if one or more of the fan blades (712) break during operation of the airplane gas turbine engine installation (700) when the heat shield (150) is positioned between the core exhaust nozzle (718) and an aircraft structure (750) of an aircraft (702) being propelled by the airplane gas turbine engine installation (700).

Clause 3. The airplane gas turbine engine installation (700) of clause 1, wherein:
  the slope (302a) is in a direction (226) that increases a shortest distance between the forward portion (202) and the heat shield (150) so that the shortest distance (D1) at the aft end (420) of the forward portion (202) is longer than the shortest distance (D2) at a forward end (422) of the forward portion (202), and
  the aft portion (204) is translated (210) away from the longitudinal axis (214) so that a centerline of aft portion (204) is parallel to the longitudinal axis (214.

Clause 4. The airplane gas turbine engine installation (700) of clause 1 or clause 2, wherein:
  the forward portion (202) of the core exhaust nozzle (718) has a plurality of forward portion station plane lofts (218) normal to the longitudinal axis (214) of the airplane gas turbine engine installation (700), each forward portion station plane loft (218) indexed with an integer n so that an $(n+1)^{th}$ station plane loft (220) is closer to the aft end (420) of the forward portion (202) than an $n^{th}$ station plane loft (224),
  the $(n+1)^{th}$ station plane loft (220) is shifted in a direction (226) perpendicular to the longitudinal axis (214) and incrementally further away from the longitudinal axis (214) as compared to the $(n+0)^{th}$ station plane loft (224), and
  the aft portion (204) of the core exhaust nozzle (718) includes aft portion station plane lofts (218b) normal to the longitudinal axis (214), each aft portion station plane loft (218b) having a centerline (212b) parallel to the longitudinal axis (214).

Clause 5. The airplane gas turbine engine installation (700) of clause 1, clause 2, or clause 3, or clause 4, wherein a clearance C between the aft portion (204) and the heat shield (150) is 0.5 inches≤C≤5 inches.

Clause 6. The airplane gas turbine engine installation (700) of clause 1, clause 2, clause 3, or clause 4, or clause 5, wherein the aircraft structure (750) is a fairing (500a), a wing (152), a fuselage (754), or an empennage (752).

Clause 7. The airplane gas turbine engine installation (700) of any of the clauses 1-6, further comprising a wedge (502, 602) attached to the forward portion (202) so that the core exhaust nozzle (718) is further canted away from the heat shield (150).

Clause 8. The airplane gas turbine engine installation (700) of any of the clauses 1-7, wherein a wedge (502, 602) is attached between the forward portion (202) and the aft portion (204).

Clause 9. The airplane gas turbine engine installation (700) of any of the clauses 1-8, wherein:

the fan blades spin about the longitudinal axis during operation of the airplane gas turbine engine installation to generate a thrust, the thrust (216a) comprises a thrust vector V at an exit plane (222) of the core exhaust nozzle (718), and a degree of the slope (302a) and length (L) of the aft portion (204) are sufficient to maintain the thrust vector parallel to the longitudinal axis (214).

Clause 10. The airplane gas turbine engine installation (700) of any of the clauses 1-9, wherein the core exhaust nozzle (718) consists essentially of a Ceramic Matrix Composite or other brittle or non-ductile material that might fracture under the contact with the heat shield (150).

Clause 11. An exhaust nozzle (201), comprising:

a forward portion (202) having a plurality of forward portion station plane lofts (218) normal to a longitudinal axis (214), each forward portion station plane loft (218) indexed with an integer n so that the $(n+1)^{th}$ station plane loft (220) is closer to an exit plane (222) of the exhaust nozzle (201) than the $(n+0)^{th}$ station plane loft (224), wherein the (n+1)th station plane loft (220) is shifted in a direction (226) perpendicular to the longitudinal axis (214) and is incrementally shifted further away from the longitudinal axis (214) relative to the $(n+0)^{th}$ station plane loft (224), and an aft portion (204) connected to the forward portion (202), the aft portion (204) including aft portion station plane lofts (218b) normal to the longitudinal axis (214), the aft portion station plane lofts (218b) having a centerline (212b) parallel to the longitudinal axis (214).

Clause 12. The exhaust nozzle (201) of clause 11, wherein:

the plurality of the forward station plane lofts (218) are shifted relative to each other by one or more amounts (210a), and the aft portion (204) has a length (L);

such that, when the exhaust nozzle (200, 201, 500) is disposed around a body (304) and flow of exhaust gas (216) between the exhaust nozzle (201) and the body (304) generates thrust (216a), the thrust (216a) has a thrust vector V substantially parallel to the longitudinal axis (214) at the exit plane (222) of the exhaust nozzle (201).

Clause 13. The exhaust nozzle (201) of clause 10 or clause 12, wherein:

the exhaust nozzle (201) comprises a core exhaust nozzle (718) for a airplane gas turbine engine installation (700) comprising a fan (104, 710), the fan (104, 710) including fan blades (712), and the one or more amounts (210a) and the length (L) prevent contact between a heat shield (150) and the exhaust nozzle (201) if one or more of the fan blades (712) break during operation of the fan (104, 710) under flight conditions when the heat shield (150) is positioned between the core exhaust nozzle (718) and an aircraft structure (750) of an aircraft (702) propelled using the core exhaust nozzle (718).

Clause 14. The exhaust nozzle (201) of any of the clauses 11-13, wherein a clearance C between the aft portion (204) of the core exhaust nozzle (718) and the heat shield (150) is 0.5 inches≤C≤5 inches.

Clause 15. The exhaust nozzle (201) of clause 13 or 14, wherein the aircraft structure (750) is a wing (152), a fuselage (754), or an empennage (752).

Clause 16. The exhaust nozzle (201) of any of the clauses 11-15, further comprising a wedge (502, 602) attached to the forward portion (202) so that the core exhaust nozzle (718) is further canted away from the heat shield (150).

Clause 17. The exhaust nozzle (201) of any of the clauses 11-16, wherein the wedge (502, 602) is between the forward portion (202) and the aft portion (204).

Clause 18. The exhaust nozzle (201) of any of the clauses 11-17, wherein the exhaust nozzle (201) consists essentially of a Ceramic Matrix Composite or other brittle or non-ductile material that might fracture under the contact with the heat shield (150).

Clause 19. The exhaust nozzle (201) of any of the clauses 11-18, wherein the $(n+1)^{th}$ station plane loft (220) has a smaller flow area (A), as compared to the $(n+0)^{th}$ station plane loft (224).

Clause 20. A method of making an exhaust nozzle (201), comprising:

identifying a forward portion (202) and an aft portion (204) of the exhaust nozzle (201);

skewing (206) the forward portion (202) at an angle away from a heat shield (150); and positioning the aft portion (204) so that the aft portion (204) is translated (210), wherein a first centerline (212a) of the forward portion (202) and a second centerline (212b) the aft portion (204) intersect but the second centerline (212b) of the aft portion (204) remains substantially parallel to an aft direction (216c) as to minimize any impact on thrust (216a) in the aft direction (216c) generated by exhaust gas (216) exiting the aft portion (204).

Clause 21. The method of clause 20, wherein the exhaust nozzle (201) is fabricated using a fiber lay up process suitable for fabricating a ceramic matrix composite material.

Advantages and Improvements

Embodiments described herein solve the problem of moving the forward and aft portion of the nozzle far enough away from the heat shield structure without adversely affecting the thrust generated by the aft portion. Pivoting the entire centerline of the nozzle does not provide sufficient clearance at the forward and mid portions of the nozzle structure and typically provides excessive clearance at the aft portion of the nozzle (more than is needed), resulting in increased losses and undesirable thrust vector changes.

Exemplary solutions described herein allow for tailored clearances to the heat shield along the length of the nozzle that are not achievable by simply pivoting the nozzle centerline downward. As described herein, exemplary methods described herein comprise re-lofting the forward portion of the exhaust nozzle so that station plane lofts of the nozzle are sheared downwards while retaining the direction of the station plane lofts of the aft portion of the nozzle. The re-lofting includes (1) incrementally shearing the station plane lofts of the nozzle geometry away from the heat shield from front toward aft in the forward portion to increase clearance needed to prevent contact with the heat shield in high load cases (e.g., fan blade breakage) and (2) simply translating the station plane lofts of aft portion of the nozzle away the heat shield by a fixed amount to achieve a parallel thrust vector (as for the original non-skewed exhaust nozzle). In one or more examples, the exhaust nozzle's aerodynamics are relofted so that station plane cross-sections of the nozzle are incrementally lowered downward away from the heat shield structure in the forward portion of the nozzle (where velocities are lower and losses are less), and so that the aft portion of the exhaust nozzle lines are retained where the velocities are higher and losses from turning are higher. As a result, in one or more examples, the net thrust vector can remain relatively unchanged and maximized.

Moreover, in one or more examples, the geometry of the core exhaust nozzle retains the benefits (e.g., weight reduction) of the CMC construction without creating safety concerns for fracturing due to collisions with the exhaust nozzle due to large deflections of the exhaust nozzle or other aircraft structure.

CONCLUSION

This concludes the description of the preferred embodiments of the present disclosure. The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. An airplane gas turbine engine installation comprising:
   a nacelle comprising an inlet and a fan exhaust;
   turbo-machinery housed in the nacelle, the turbo-machinery including a fan having fan blades, an engine core including an engine combustion chamber, and a longitudinal axis of rotation of the turbo-machinery; and
   an exhaust nozzle, comprising:
      a forward portion having a plurality of forward portion station plane lofts normal to the longitudinal axis, each forward portion station plane loft indexed with an integer n so that the $(n+1)^{th}$ station plane loft is closer to an exit plane of the exhaust nozzle than the $(n+0)^{th}$ station plane loft, wherein the $(n+1)^{th}$ station plane loft is shifted in a direction perpendicular to the longitudinal axis and is incrementally shifted further away from the longitudinal axis relative to the $(n+0)^{th}$ station plane loft, and
      an aft portion connected to the forward portion, the aft portion including aft portion station plane lofts normal to the longitudinal axis, the aft portion station plane lofts having a centerline parallel to the longitudinal axis; and
      wherein each of the forward portion station plane lofts and each of aft portion station plane loft are defined as a cross section perpendicular to the longitudinal axis and the cross section defines a shape of the exhaust nozzle;
   the exhaust nozzle comprising a core exhaust nozzle connected to the engine core; the core exhaust nozzle including the forward portion and the aft portion, wherein:
      the forward portion includes a slope away from a heat shield, and
      the aft portion connected to an aft end of the forward portion is translated away from the longitudinal axis.

2. The airplane gas turbine engine installation of claim 1, wherein the slope is configured such that a clearance C between the aft portion and the heat shield is 0.25 inches≤C≤5 inches along an entire length L of the aft portion, when the heat shield is positioned between the core exhaust nozzle and an aircraft structure of an aircraft being propelled by the airplane gas turbine engine installation.

3. The airplane gas turbine engine installation of claim 2, wherein the aircraft structure is a fairing, a wing, a fuselage, or an empennage.

4. The airplane gas turbine engine installation of claim 1, further comprising a wedge attached to the forward portion, so that wedge introduces a cant of the core exhaust nozzle away from the heat shield.

5. The airplane gas turbine engine installation of claim 1, wherein:
   the slope is in a direction that increases a shortest distance between the forward portion and the heat shield so that the shortest distance at the aft end of the forward portion is longer than the shortest distance at a forward end of the forward portion, and
   the aft portion is translated away from the longitudinal axis so that the centerline of the aft portion is parallel to the longitudinal axis.

6. The airplane gas turbine engine installation of claim 1, wherein a clearance C between the aft portion and the heat shield is 0.5 inches≤C≤5 inches.

7. The airplane gas turbine engine installation of claim 4, wherein the wedge is attached between the forward portion and the aft portion.

8. The airplane gas turbine engine installation of claim 1, wherein:
   the fan blades spin about the longitudinal axis during operation of the airplane gas turbine engine installation to generate a thrust,
   the thrust comprises a thrust vector at the exit plane of the core exhaust nozzle, and
   the aft portion station plane lofts have the centerline parallel to the longitudinal axis and the thrust vector is parallel to the longitudinal axis.

9. The airplane gas turbine engine installation of claim 1, wherein the core exhaust nozzle consists essentially of a Ceramic Matrix Composite or other brittle or non-ductile material.

10. The airplane gas turbine engine installation of claim 1, wherein:
    the plurality of forward station plane lofts are shifted relative to each other by one or more amounts;
    the aft portion has a length;
    the aft portion station plane lofts have the centerline parallel to the longitudinal axis; and
    such that, when the exhaust nozzle is disposed around a body and flow of gas between the exhaust nozzle and the body generates a thrust, the thrust has a thrust vector parallel to the longitudinal axis at the exit plane of the exhaust nozzle.

11. The exhaust nozzle airplane gas turbine engine installation of claim 10, wherein:
    the one or more amounts and the length are such that a clearance C between the aft portion and the heat shield is 0.25 inches≤C≤5 inches along an entirety of the length of the aft portion, when the heat shield is positioned between the core exhaust nozzle and an aircraft structure of an aircraft propelled using the exhaust nozzle.

12. The airplane gas turbine engine installation of claim 11, wherein the clearance C between the aft portion of the core exhaust nozzle and the heat shield is 0.5 inches≤C≤5 inches.

13. The airplane gas turbine engine installation of claim 11, wherein the aircraft structure is a wing, a fuselage, or an empennage.

14. The airplane gas turbine engine installation of claim 13, further comprising a wedge attached to the forward portion so that the wedge introduces a cant of the core exhaust nozzle away from the heat shield.

15. The airplane gas turbine engine installation of claim 14, wherein the wedge is between the forward portion and the aft portion.

16. The airplane gas turbine engine installation of claim 1, wherein the $(n+1)^{th}$ station plane loft has a smaller flow area, as compared to the $(n+0)^{th}$ station plane loft.

17. A method of making an airplane gas turbine engine installation, comprising:
 obtaining a nacelle comprising an inlet and a fan exhaust;
 obtaining turbo-machinery housed in the nacelle, the turbo-machinery including a fan having fan blades, an engine core including an engine combustion chamber, and a longitudinal axis of rotation of the turbo-machinery; and
 making an exhaust nozzle, comprising:
  identifying a forward portion and an aft portion of the exhaust nozzle;
  skewing the forward portion at an angle away from a heat shield; and
  positioning the aft portion so that the aft portion is translated, wherein:
  a first centerline of the forward portion and a second centerline the aft portion intersect but the second centerline of the aft portion remains parallel to an aft direction as to minimize any impact on thrust in the aft direction generated by exhaust gas exiting the aft portion;
  the forward portion has a plurality of forward portion station plane lofts normal to the longitudinal axis, each forward portion station plane loft indexed with an integer n so that the $(n+1)^{th}$ station plane loft is closer to an exit plane of the exhaust nozzle than the $(n+0)^{th}$ station plane loft, wherein the $(n+1)^{th}$ station plane loft is shifted in a direction perpendicular to the longitudinal axis and is incrementally shifted further away from the longitudinal axis relative to the $(n+0)^{th}$ station plane loft; and
  the aft portion connected to the forward portion, the aft portion including aft portion station plane lofts normal to the longitudinal axis, the aft portion station plane lofts having a centerline parallel to the longitudinal axis,
  wherein each of the forward portion station plane lofts and each of aft portion station plane loft are defined as a cross section perpendicular to the longitudinal axis and the cross section defines a shape of the exhaust nozzle;
  connecting the exhaust nozzle, comprising a core exhaust nozzle, to the engine core; the core exhaust nozzle including the forward portion and the aft portion, wherein:
   the forward portion includes a slope away from the heat shield, and
   the aft portion connected to an aft end of the forward portion is translated away from the longitudinal axis.

18. The method of claim 17, wherein the exhaust nozzle consists essentially of a Ceramic Matrix Composite or other brittle or non-ductile material.

19. The method of claim 17, wherein the exhaust nozzle is fabricated using a fiber lay-up process for fabricating a ceramic matrix composite material.

20. The method of claim 17, wherein the heat shield is positioned between the core exhaust nozzle and an aircraft structure of an aircraft being propelled by the airplane gas turbine engine installation, wherein the aircraft structure is a wing, a fuselage, or an empennage.

21. The method of claim 17, wherein a clearance C between the aft portion of the core exhaust nozzle and the heat shield is 0.5 inches≤C≤5 inches.

* * * * *